United States Patent
Nosse

(12)
(10) Patent No.: US 6,211,490 B1
(45) Date of Patent: Apr. 3, 2001

(54) NOZZLE FOR SHIELDED ARC WELDING GUN

(75) Inventor: Joseph R. Nosse, Richmond Hts., OH (US)

(73) Assignee: Lincoln Global, Inc., Monterey Park, CA (US)

(*) Notice: Subject to any disclaimer, the term of this patent is extended or adjusted under 35 U.S.C. 154(b) by 0 days.

(21) Appl. No.: 09/336,596

(22) Filed: Jun. 21, 1999

(51) Int. Cl.[7] .................................................. B23K 9/173
(52) U.S. Cl. ........................................................ 219/137.62
(58) Field of Search ........................ 219/137.62, 137.31, 219/137.63, 137.42, 136

(56) References Cited

U.S. PATENT DOCUMENTS

| | | |
|---|---|---|
| 3,192,356 | 6/1965 | Shrubsall . |
| 3,308,266 | 3/1967 | Adams . |
| 3,398,231 * | 8/1968 | Sullivan ........................... 219/137.42 |
| 3,529,126 * | 9/1970 | Reeh ................................ 219/137.62 |
| 4,309,590 * | 1/1982 | Stol ................................. 219/137.62 |
| 4,582,979 * | 4/1986 | Moerke ........................... 219/137.63 |
| 4,864,099 * | 9/1989 | Cusick, III et al. ............. 219/137.62 |
| 5,155,330 | 10/1992 | Fratiello et al. . |
| 5,175,405 | 12/1992 | Karimine et al. . |
| 5,313,046 * | 5/1994 | Zamuner ......................... 219/137.62 |
| 5,349,158 * | 9/1994 | Mari ................................ 219/137.62 |
| 5,605,283 | 2/1997 | Lahnsteiner . |
| 5,670,073 * | 9/1997 | Kiilunen ......................... 219/137.62 |
| 5,773,779 | 6/1998 | Morlock . |

* cited by examiner

*Primary Examiner*—Clifford C. Shaw
(74) *Attorney, Agent, or Firm*—Vickers, Daniels & Young

(57) ABSTRACT

A nozzle for a welding gun for shielded arc welding comprises a cooling fluid section and a gas nozzle assembly structured to optimize the cooling and thermal protection of the component parts of the gas nozzle assembly from melting or other damage resulting from exposure to extremely high temperatures in connection with performing a shielded arc welding process in a confined space having limited heat dissipating capability. The cooling fluid section has inlet and outlet passageway portions including changes in heat transfer surface areas, and a heat sink and insulating section is provided between the cooling fluid section and the gas nozzle assembly. The gas nozzle assembly includes a sleeve of thermosetting silicone material to optimize transfer of heat from the gas diffuser and shroud components thereof to the heat sink and insulating section.

58 Claims, 5 Drawing Sheets

NOZZLE FOR SHIELDED ARC WELDING GUN

BACKGROUND OF THE INVENTION

This invention relates to the art of electric arc welding and, more particularly, to a nozzle for a welding gun for shielded arc welding in a confined environment in which the gas nozzle assembly of the nozzle is subjected to extremely high temperatures.

In the field of gas shielded metal arc welding, it is of course well known to provide a welding gun having a nozzle through which a welding wire electrode and gas are fed coaxially towards workpieces to be welded. Such a welding gun nozzle generally includes a gas nozzle assembly through which the electrode and gas freely pass toward a workpiece with the electrode being electrically energized at the outlet end of the nozzle assembly. The shielding gas is diffused into a cylindrical stream around the electrode as it emerges from the outlet end of the assembly.

A nozzle for a shielded arc welding gun in accordance with the present invention finds particular utility in conjunction with the welding together of closely spaced apart longitudinally adjacent railway rails and under conditions which subject the gas nozzle assembly thereof to extremely high and potentially damaging temperatures. Accordingly, the invention is described herein in detail in connection with such use. At the same time, however, it will be appreciated that a nozzle according to the invention can be used other than for welding railroad rails and, in particular, can be used in welding workpieces in other confining environments in which the gas nozzle assembly of the nozzle is subjected to high temperatures.

In co-pending application Ser. No. 950,408 filed Oct. 15, 1997 and assigned to the same assignee as the present application, now U.S. Pat. No. 5,773,779, issued Jun. 30, 1998, and the subject matter of which co-pending application is hereby incorporated herein by reference for purposes of background information, shielded arc welding processes are disclosed for installing and repairing railroad rails in the field by joining the ends of longitudinally adjacent rails. The rails to be joined are longitudinally spaced apart about one inch and are of standard cross-sectional shape and accordingly have a laterally extending lower base which is relatively wide and a web extending upwardly from the base and merging into an upper wheel engaging head. Preferably, a steel barrier plate is wedged between the lower ends of the bases of the adjacent rails, the rails are preheated to a temperature of about 900–1,000° F. and the gap between the rails is filled with molten metal by the gas shielded arc welding process which is initiated by bringing a welding gun nozzle downwardly into the gap between the rails until the electrode of the gun contacts the barrier plate to initiate the welding process. The nozzle of the welding gun is moved laterally back and forth across the gap between the rails to fill the gap between the bases of the rails and, when the welding process approaches the gap between the web portions of the rails, contoured copper shoes are used to close the gap between the webs and heads so that the latter gap provides an enclosed cavity. This cavity is filled by continuing the shielded gas welding process referred to hereinabove and by which beads of filler metal are continuously laid sequentially in laterally opposite directions between the laterally opposite sides of the webs and heads of the rails.

A major problem encountered in connection with the welding of railroad rails through the use of shielded arc welding gun equipment heretofore available is the difficulty of completing the welding process without the gas nozzle assembly of the gun being damaged or destroyed by the extreme heat generated by the welding process. In particular, the heat in the gap between the webs and heads basically is dissipated only from the opening at the top edges of the heads due to the enclosed cavity created by the copper shoes extending vertically along the laterally opposite ends of the webs and heads of the rails. Further, the gas nozzle assembly is initially exposed or subjected to a high temperature as the result of the preheating of the rails, and the copper shoes provide a chimney effect which not only confines the heat in the cavity defined by the rail ends and shoes but also restricts dissipation of the heat through the upper end of the cavity, whereby the gas nozzle assembly is subjected to the heat flowing upwardly thereacross to the upper end of the cavity. The cavity additionally has a vertical depth of more than six inches whereby it will be appreciated that the nozzle assembly is subjected to considerable heat, which can reach over 2,000° F., over a considerable period of time as the nozzle assembly is laterally translated back and forth in the gap to progressively lay the beads of molten metal necessary for filling the gap and joining the rails. With shielded arc welding guns heretofore available, melting of the gas nozzle assembly or parts thereof, and thus destruction of the latter can occur prior to completion of the welding process. Partially in this respect, and in addition to the confined space from which heat dissipation is limited, the fact that the gap between the longitudinally adjacent rails is about one inch necessitates the nozzle assembly having a small outer diameter, generally about 5/8 inch. Accordingly, the outer jacket or gas shroud component of the nozzle assembly is extremely thin walled as are the other component parts of the nozzle assembly. Moreover, the electrical insulation provided between the outer copper shroud and the inner copper gas diffuser retards the transfer of heat from the shroud and this, together with inadequate cooling of the gas nozzle assembly, results in the parts of the gas nozzle assembly and especially the gas shroud being quickly heated and having little resistance to the damaging effect of high temperatures, including melting thereof. Melting of the gas nozzle assembly, or parts thereof, is not only costly from the standpoint of the loss of equipment but also from the standpoint of lost time with respect to completing the process and the likelihood of a loss in the quality of the welded joint resulting from the interruption of the process. In this respect, in order to provide a sound metal interface between the ends of the rails and the weld metal produced by the electrode, the laying of the successive beads must be continuous throughout the process.

SUMMARY OF THE INVENTION

In accordance with the present invention, a nozzle is provided for a welding gun for shielded arc welding which advantageously enables the welding of railroad rails in the foregoing manner without melting or otherwise damaging or destroying the gas nozzle assembly or parts thereof. More particularly in this respect, a welding gun nozzle according to the present invention has coaxial, sequentially arranged cooling fluid and gas nozzle assembly sections structured to promote heat transfer and thus cooling of the component parts of the gas nozzle assembly and the transfer of heat from the component parts of the nozzle assembly to the cooling fluid section. The cooling fluid section is structured to optimize the quantity and rate of cooling fluid flow therethrough and the surface area for heat transfer to the cooling fluid and, additionally, to provide a heat sink and insulating section for absorbing and dissipating heat at the juncture between the cooling fluid section and the gas nozzle assembly. The gas nozzle assembly provides the outlet end of the gun nozzle and includes a tubular shroud and a gas diffusing component therein which is electrically insulated from the shroud by a material which promotes the transfer of heat from the shroud to the diffuser and to the heat sink.

Preferably, the cooling fluid section comprises an outer jacket and an inner core generally coextensive therewith and having axially extending surface portions which divide the jacket into diametrically opposite inlet and outlet portions of a cooling fluid passageway having a crossover portion at the inner end of the jacket and the adjacent portion of the core for connecting the inlet and outlet portions of the passageway. Accordingly, all of the surface area of the core and the inner surface of the jacket other than the surfaces thereof interengaged to separate the inlet and outlet portions of the passageway advantageously provide heat transfer surfaces contacted by the cooling fluid flowing therethrough, whereby cooling of the jacket in particular is optimized. The insulating heat transfer material between the gas diffuser and shroud is a thermosetting plastic material which is preferably molded in place on the inner surface of the shroud and is threadedly interengaged with the gas diffuser so as to provide a tight connection therewith which is free of any air gaps or other paths which would retard or reduce the transfer of heat to the gas diffuser and heat sink. Moreover, the inner end of the cooling fluid section is removably interengaged with the inner end of the gas nozzle assembly and is structured for the heat sink and insulating section to optimize against the transfer of heat to the gas nozzle assembly.

It is accordingly an outstanding object of the present invention to provide an improved nozzle for a welding gun for shielded arc welding in an environment in which the nozzle is subjected to extremely high temperatures, such as a confined space from which the dissipation of heat is limited.

Another object is the provision of a nozzle of the foregoing character having a cooling fluid section and a gas nozzle assembly and wherein the cooling fluid section provides improved cooling capability with respect to the component parts of the nozzle assembly than heretofore possible.

A further object is the provision of a nozzle of the foregoing character wherein the flow of cooling fluid through the cooling fluid section is optimized with respect to quantity and rate of flow as well as the surface areas providing for heat transfer, and wherein a heat sink and insulating section is associated with the gas nozzle assembly and cooling fluid section, thus to optimize cooling of the component parts of the gas nozzle assembly.

Yet another object is the provision of a nozzle of the foregoing character having a gas nozzle assembly including a gas diffuser and a gas shroud electrically insulated from one another by a material which promotes heat transfer from the shroud to the diffuser and cooling fluid section.

Still a further object is the provision of a nozzle of the foregoing character in which the cooling fluid section and gas nozzle assembly are structured and interengaged to provide a heat sink therebetween by which cooling fluid flowing through the cooling fluid section flows about the area of interconnection to optimize transferring heat from the gas nozzle assembly.

Yet a further object is the provision of a nozzle of the foregoing character which is operable to join longitudinally adjacent railway rails by insertion into the gap therebetween which during a portion of the welding process is laterally closed to provide a confining cavity from which the escape of heat is limited and wherein the welding process can be carried out without the melting or other damaging of the gas nozzle assembly or parts thereof heretofore encountered in connection with such a welding procedure.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawings in which.

DESCRIPTION OF A PREFERRED EMBODIMENT

Figure 1:
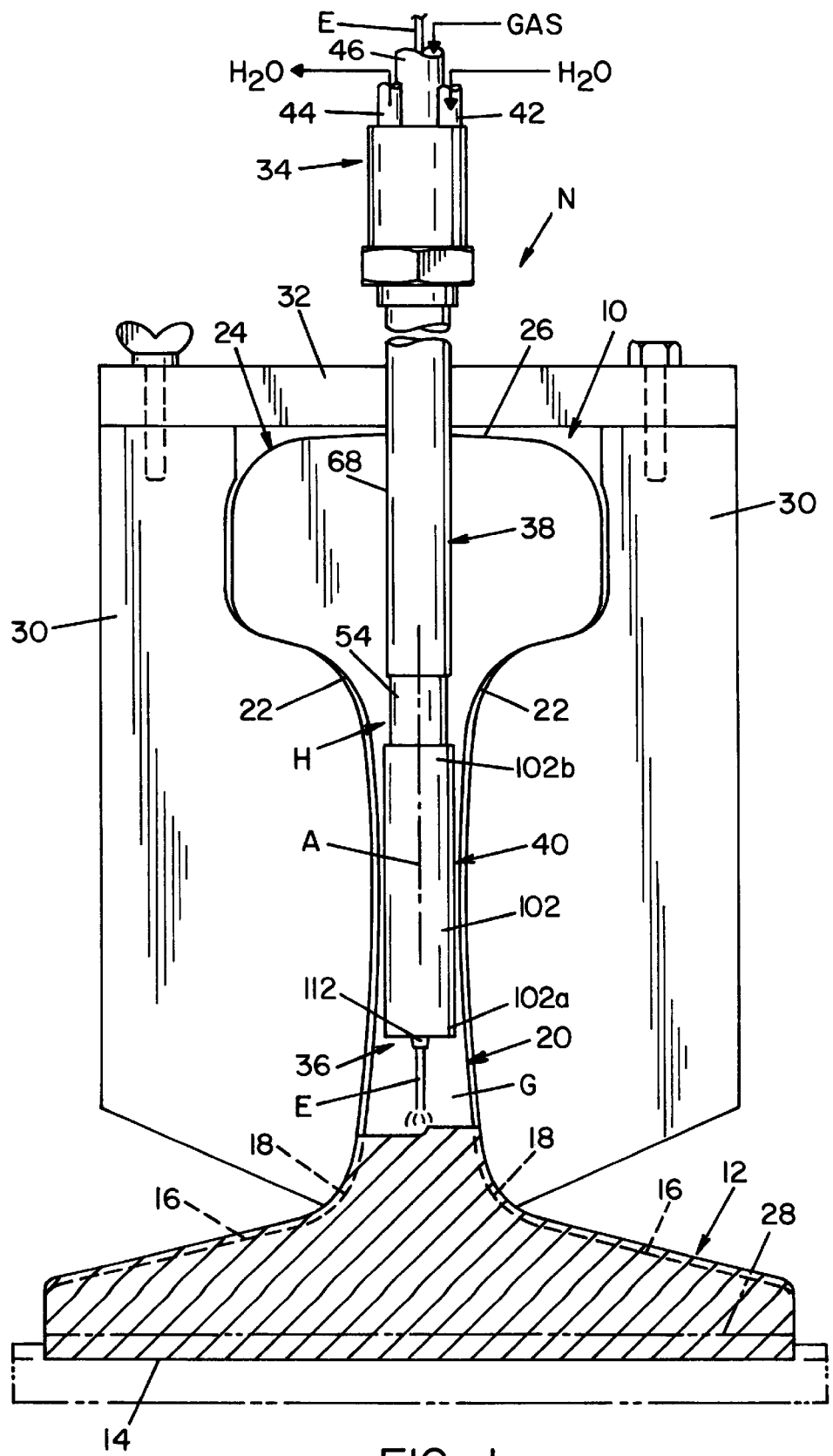
FIG. 1 is an end elevation view, partially in section, in the longitudinal gap between longitudinally adjacent railway rails showing the sides of the gap closed by shoes and a welding gun nozzle in accordance with the present invention laying weld material in the gap.

Referring now in greater detail to the drawings, wherein the showings are for the purpose of illustrating a preferred embodiment of the invention only and not for the purpose of limiting the invention, FIG. 1 shows the vertical end face of a railroad rail 10 which has a standard profile or cross-section including a lower base 12 which is laterally wide and includes a bottom surface 14 by which the rail is supported on underlying railroad ties, not shown. Base 12 has upwardly and inwardly angled top portions 16 which merge through fillets 18 into a vertically extending web 20 which merges through fillets 22 at its upper end with head 24 which includes an upper wheel support surface 26. While not shown, it will be appreciated that rail 10 is longitudinally spaced apart from a second rail having the same standard profile to provide a longitudinal gap G between the base, web and head portions of the two rails, which gap has a longitudinal length of 1.00 inch. Preferably, as disclosed and described in the aforementioned co-pending patent application, a plate 28 of low carbon steel is wedged in gap G between the lowermost portions of the bases of the two rails to support the arc during the starting of the welding operation. As is further described in the aforementioned co-pending application, several layers of welding metal are laid transversely across gap G in the lower portion of the gap between bases 12 of the two rails and, when the filling operation reaches the transition areas into web 20, copper shoes 30 which depend from top support bars 32 are moved to close the laterally opposite ends of gap G between webs 20 and heads 24 of the adjacent rails to confine the weld metal laterally inwardly of the opposite sides of the gap. Support bars 32 are longitudinally spaced apart so that the gap is open between top surfaces 26 to receive the welding nozzle assembly.

FIG. 1 illustrates a welding gun nozzle N in gap G and having an electrode E which advances downwardly from the nozzle to deposit weld metal in gap G as the nozzle is translated laterally in opposite directions across the gap and withdrawn upwardly therein to lay the succeeding layers of weld metal. In connection with the welding process, the two rails are preheated to a temperature of about 1,000° F. prior to initiating the depositing of weld metal in the gap between the bases of the rails and, as will be appreciated from FIG. 1, such preheating together with heat generated by the welding process and the confining of nozzle N in the gap when shoes 30 are positioned to close the opposite ends thereof provides for nozzle N to be subjected to temperatures as high as 2,000° F. as the welding process progresses upwardly into the web and head portions of the gap between the rails. As will become apparent hereinafter, a nozzle N constructed in accordance with the present invention advantageously enables the foregoing welding process to be performed without melting or otherwise damaging the component parts of the gas nozzle assembly portion thereof. More particularly in this respect, as shown generally in FIG. 1 and in detail in FIGS. 2–9, nozzle N has an outer or inlet end 34 in the form of a coupling adapted to be connected to a welding gun, not shown, and a lower or outlet end 36 from which electrode E emerges together with a surrounding shielding gas as will become apparent hereinafter. Nozzle N includes a cooling fluid section 38 and a gas nozzle assembly 40 which are axially adjacent to one another and coaxial with respect to nozzle axis A. Inlet end 34 of the nozzle includes cooling fluid inlet and outlet lines 42 and 44, respectively, by which a cooling fluid such as water can be flowed through the cooling fluid section as described in greater detail hereinafter. Inlet end 34 is also connected to a source of shielding gas which flows through inlet end 46 of a shielding gas and electrode passageway which extends through nozzle N to outlet end 36 thereof as will become apparent hereinafter.

Referring now in particular to FIGS. 2–7 of the drawing, cooling fluid section 38 includes a cooling water jacket coaxial with axis A and comprising a copper sleeve 48 having axially outer and inner ends 50 and 52, respectively, and an outer connecting sleeve 54 of insulating material. Sleeve 54 has an inner end 56 and, as will become apparent hereinafter, provides part of a heat sink and insulating section H at the inner end of cooling fluid section 38. The cooling fluid section further includes a cooling core comprising a copper core member 58 having an axially outer end 60 axially outwardly adjacent outer end 50 of sleeve 48 and a circular axially inner end portion 62 in sleeve 54 and having a terminal end 64 adjacent inner end 56 of sleeve 54. Ends 56 and 64 define the axially inner end of heat sink and insulating section H. Heat sink and insulating section H is further defined by an insulating sleeve 66 extending axially along copper tube 48 from a lower end axially overlapping insulating sleeve 54 to an upper end which, as will become apparent hereinafter, extends axially upwardly to a point intermediate the outer and inner ends of core member 58. The heat sink and insulating section is still further defined by an outer steel jacket 68 which axially overlies insulating sleeve 66. The axially inner end portion 62 of cooling core 58 is internally threaded for interconnecting the cooling fluid section 38 and gas nozzle assembly 40 as described in greater detail hereinafter. Core member 58 is provided with a bore 70 extending axially therethrough to provide the portion of the shielding gas and electrode passageway extending through the cooling fluid section for the passage of electrode E and shielding gas from inlet 46 mentioned above.

Figure 2:
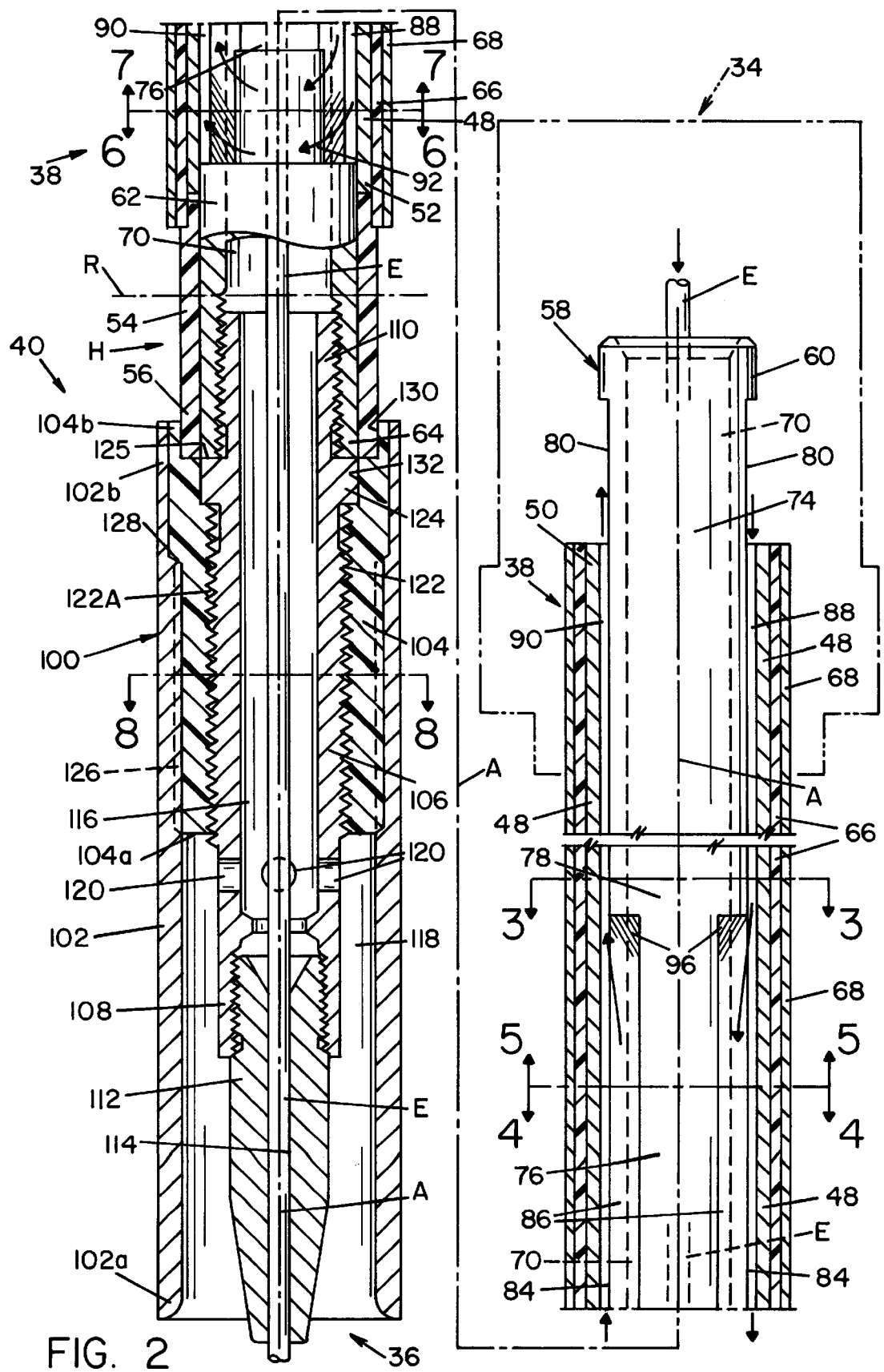
FIG. 2 is a sectional elevation view of the nozzle shown in FIG. 1.
Figure 3:
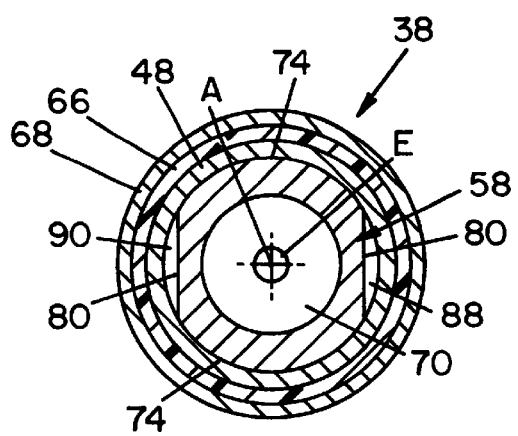
FIGS. 3, 4, 5, 6, and 7 are cross-sectional views of the cooling fluid section of the nozzle respectively taken along lines 3—3, 4—4, 5—5, 6—6, and 7—7 in FIG. 2.
Figure 4:
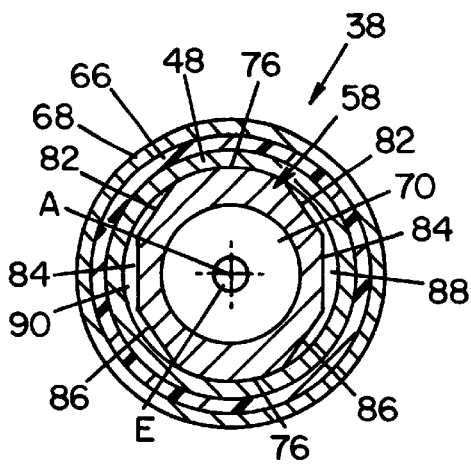
Figure 5:
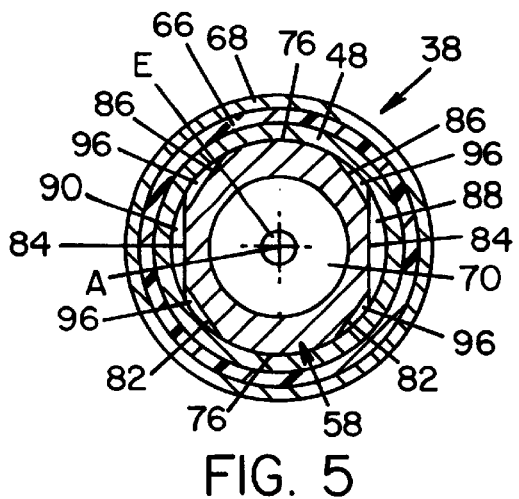
Figure 6:
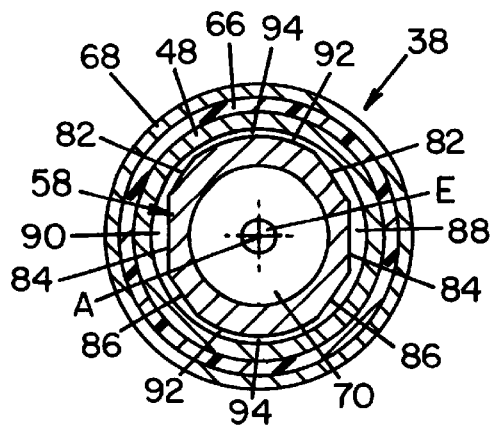
Figure 7:
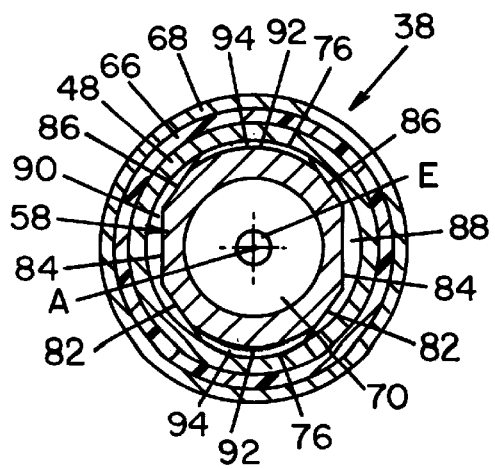
Figure 9:
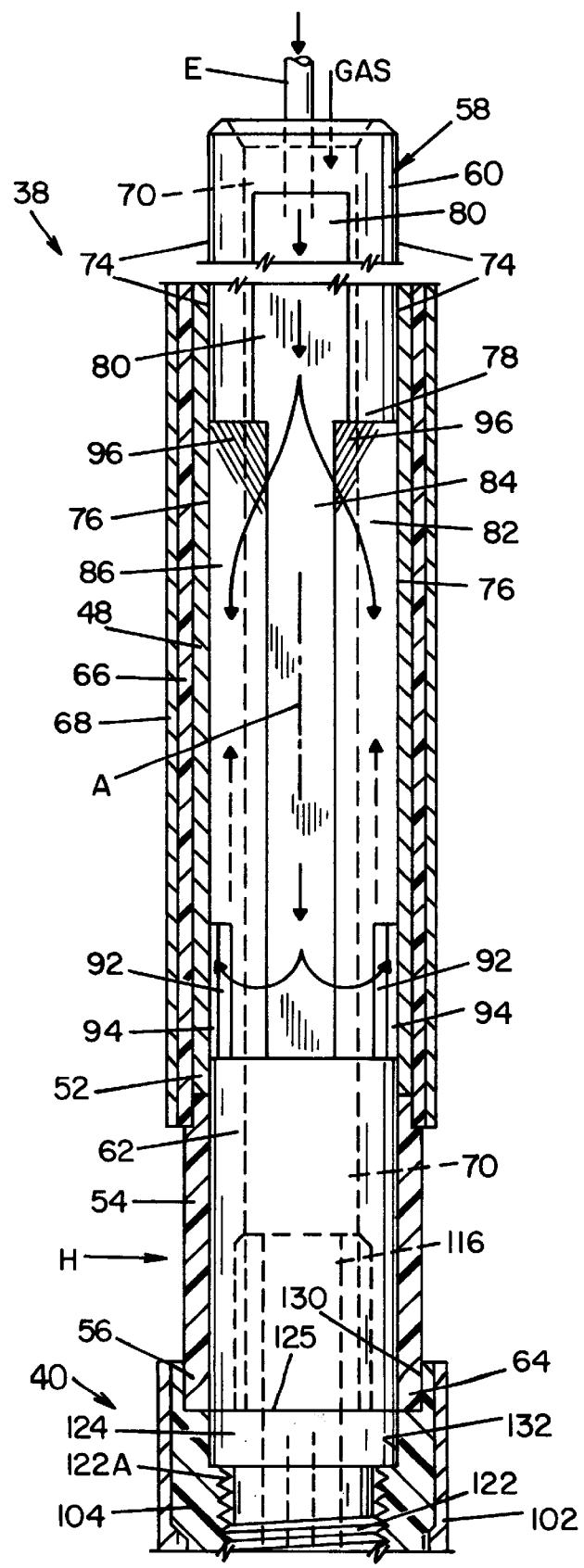
FIG. 9 is a sectional elevation view of the heat sink of the cooling fluid section and the adjacent end of the gas nozzle assembly looking from right to left in FIG. 2; and, FIG. 10 is a sectional elevation view of the shield and insulating sleeve.

As best seen in FIGS. 2, 3, 4, and 9 of the drawing, core member 58 has diametrically opposed first and second pairs of outer surfaces 74 and 76, respectively, engaging the inner surface of cooling jacket sleeve 48 between outer and inner ends 50 and 52 thereof. More particularly, diametrically opposed surfaces 74 extend from outer end 60 of core member 58 to a location 78 intermediate outer end 60 and inner end 64 of the core member, and diametrically opposed surfaces 76 extend from location 78 to a point axially inwardly adjacent the inner end of end portion 62 of the core member. Surfaces 74 engage the inner surface of sleeve 48 a circumferential extent which is greater than the circumferential extent of engagement of surfaces 76 with the inner surface of the sleeve. Further, the circumferentially opposite ends of surfaces 74 are connected by opposed parallel surfaces 80 which are spaced radially inwardly from the inner surface of sleeve 48 and the circumferentially opposite ends of surfaces 76 are interconnected by diametrically opposed pluralities of planar surfaces 82, 84 and 86 which are at angles to one another and spaced radially inwardly from the inner side of sleeve 48. Diametrically opposed surfaces 74 and 76 together with surfaces 80 and surfaces 82, 84 and 86 divide the interior of the cooling jacket into diametrically opposed inlet and outlet coolant passageway portions 88 and 90, respectively. As will be appreciated from the description of FIG. 1 herein, passageway portions 88 and 90 are respectively connected to water inlet and outlet lines 42 and 44. Inlet portion 88 of the cooling fluid passageway extends from the outer end of the cooling fluid section to the inner end thereof, and the outlet portion of the passageway extends from the inner end of the cooling fluid section to the outer end thereof. Moreover, the structure of the cooling core provides for communication between the inlet and outlet portions of the cooling fluid passageway intermediate the axially opposite ends of heat sink and insulating section H. More particularly in this respect, as best seen in FIGS. 2, 6 and 9 of the drawing, core member 58 is provided with diametrically opposed arcuate surfaces 92 axially inwardly adjacent the inner end of end portion 62 of the core member. Surfaces 92 are aligned with surfaces 76 and offset radially inwardly therefrom and thus from the inner side of sleeve 48 so as to provide connecting passageway portions 94 between the inlet and outlet passageway portions. As will be appreciated from FIGS. 2 and 9, cooling water flowing downwardly through inlet passageway portion 88 cools heat sink and insulating section H as the water makes the transition from inlet passageway portion 88 to outlet passageway portion 90. Preferably, as will be appreciated from FIGS. 2 and 5, transition surfaces 96 are provided axially and circumferentially between surfaces 74 and 76 and the corresponding surfaces 82 and 86 at the juncture between surfaces 74 and 76. The cooling fluid section 38, as defined by the component parts thereof in FIG. 2 which are above reference line R, is commercially available.

Figure 8:
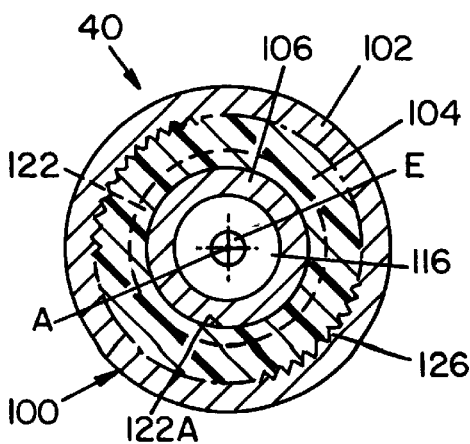
FIG. 8 is a cross-sectional view through the gas nozzle assembly of the nozzle taken along line 8—8 in FIG. 2.
Figure 10:
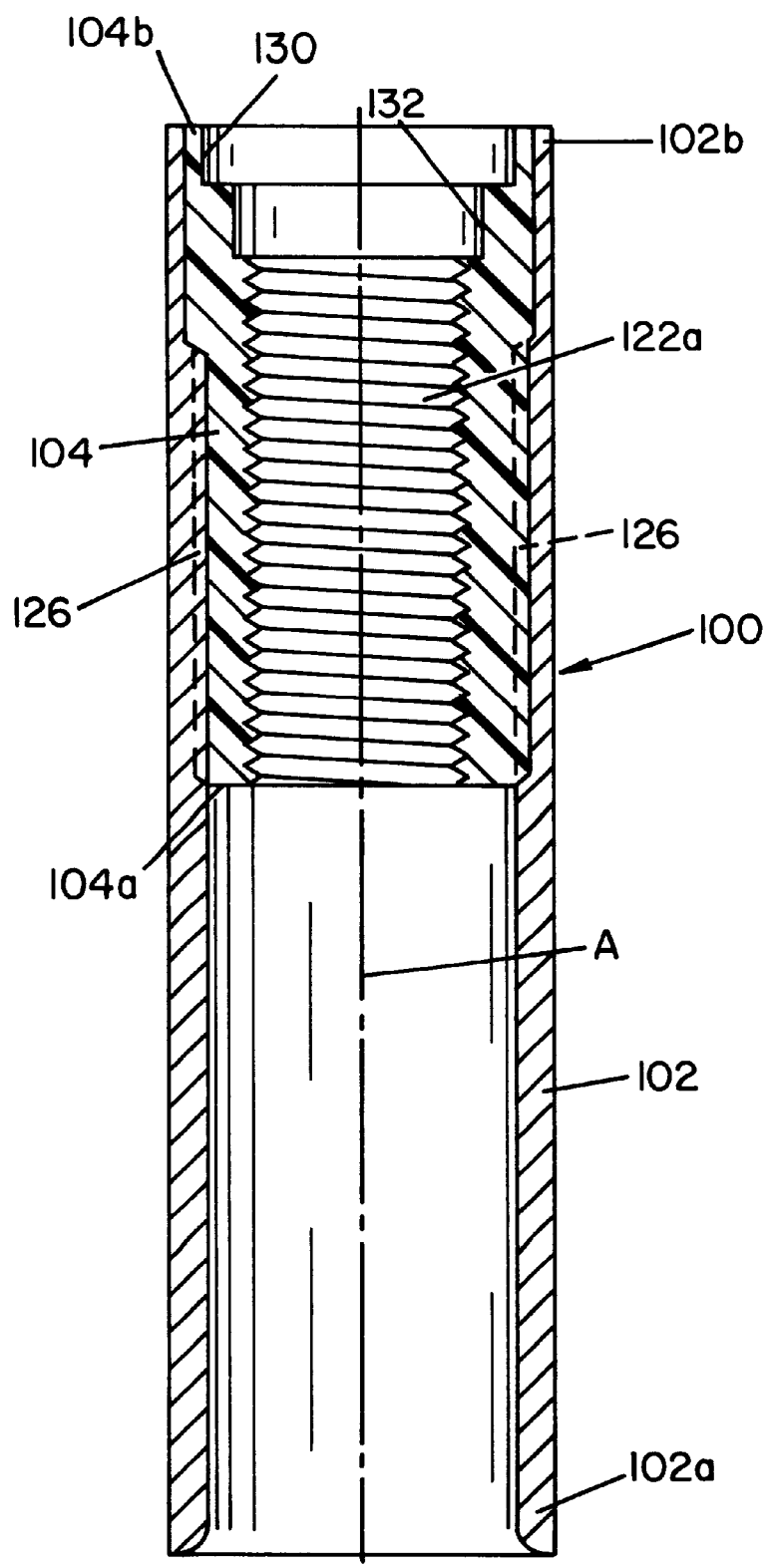

Referring now to FIGS. 2, 8 and 10 of the drawing, gas nozzle assembly 40 includes a gas nozzle component 100 coaxial with axis A and comprising an outer cylindrical gas shroud 102 of copper and an inner sleeve 104 of electrically insulating, heat transferring plastic material joined thereto as set forth hereinafter. Shroud 102 has an axially outer end 102a at outlet end 36 of nozzle N and an axially inner end 102b which is radially outwardly of and axially overlies axially inner end 56 of connecting sleeve 54. Gas nozzle assembly 40 further includes a tubular gas diffuser 106 of copper having an internally threaded axially outer end 108 and an externally threaded axially inner end 110. End 110 is threadedly interengaged with the internally threaded inner end 64, of sleeve 62 of the cooling jacket and thus with heat sink H and the inner end of the cooling section as defined by ends 56 and 64 of the outer and inner connecting sleeves 54 and 62. This advantageously promotes the transfer of heat from diffuser 106 to the heat sink. Axially outer end 108 of the gas diffuser receives an externally threaded copper contact tip 112 having a bore 114 extending axially therethrough for receiving electrode E. Gas diffuser 106 and tip 112 are coaxial with axis A and diffuser 106 includes a bore 116 therethrough which communicates at the axially inner end of the diffuser with the interior 70 of inner connecting sleeve 62, thus providing the outlet portion of the shielding gas and electrode passageway through the nozzle assembly. Outer end 108 of the diffuser is spaced radially inwardly from the inner side of shroud 102 to provide an annular chamber 118 therewith, and the diffuser is provided upstream from end 108 with radially extending ports 120 through which shielding gas flows from bore 116 to chamber 118 and thence axially across tip 112 and axially outwardly of end 102a of the shroud and circumferentially about electrode E.

Gas diffuser 106 is provided with external threads 122 extending from a radially outwardly extending peripheral flange 124 to a location axially inwardly adjacent radial ports 120. The inner surface of shroud 102 is provided circumferentially thereof with knurling 126 which extends axially inwardly from the location of the outer end of threads 122 to a location axially inwardly adjacent flange 124 at which the inner surface of shroud 102 is radially enlarged to provide an annular shoulder 128. Shroud 102 and diffuser 106 are diametrically dimensioned in the areas of threads 122 and knurling 126 to provide an annular chamber therebetween which is tightly filled by the sleeve 104 of heat transferring plastic material. Sleeve 104 has axially outer and inner ends 104a and 104b, respectively, and end 104b surrounds the adjacent end of heat sink H. Sleeve 104 is molded in place in shroud 102 under heat and pressure and has internal threads 122A between the axially opposite ends thereof per threaded interengagement with threads 122 on gas diffuser 106. Preferably sleeve 104 is of a thermosetting plastic material having a low coefficient of thermal expansion and a high thermal conductivity, thus providing desirable protection for the gas diffuser and shroud by transferring heat from the shroud to the heat sink via, in part, diffuser 106. A preferred material for the heat transfer sleeve is a moldable, thermosetting silicone compound available from General Electric under the latter's product designation MC550. The low coefficient of thermal expansion advantageously protects against stress fractures and thus leakage paths which would reduce heat transfer across the material, and the threaded interengagement between the plastic material and gas diffuser optimizes the surface area therebetween for transferring heat to and along the heat transferring sleeve and diffuser. By molding the sleeve on the inner side of shroud 102, the threaded interengagement of the sleeve with diffuser 106 provides a tight interface therebetween, thus to avoid any air spaces which would reduce heat transfer. Moreover, the molding of the plastic material against the knurled inner surface of the shroud again promotes optimizing the surface area of interengagement therebetween and, additionally, restrains any circumferential or axial separation therebetween which might occur in screwing gas nozzle component 100 onto or off of the gas diffuser, or in screwing the gas nozzle assembly onto or off of heat sink H. As will be appreciated from FIG. 2, axially inner end 104b of insulating sleeve 104 terminates at inner end 102b of shroud 102 in axially adjacent, radially stepped recesses 130 and 132. Recess 130 is radially coplanar with the axially inner side 125 of flange 124, and recess 132 axially and radially receives flange 124. Further, recess 130 tightly interengages with end 56 of connecting sleeve 54, and the terminal end faces of connecting sleeves 54 and 64 facially engage the inner end of recess 130 and end face 125 of flange 124, respectively. Accordingly, it will be appreciated that flange 124 and end 104b of sleeve 104 are in heat transferring contact with heat sink H. Moreover, it will be appreciated that flange surface 125 engages with the end face of terminal end 64 to determine the mounted position of the gas nozzle assembly on the fluid cooling section, and the axially inner end of recess 130 engages with the end face of sleeve 54 to close the axially inner end of the heat sink of the cooling fluid section to seal the latter end of the chamber.

In the embodiment herein illustrated and described, the gas nozzle assembly has an outer diameter defined by the outer diameter of shroud 102 of $5/8$ inch, and shroud 102 has an inner diameter of about $1/2$ inch, whereby the wall thickness of the shroud is $1/16$ inch. Heat transfer sleeve 104 has a radial thickness of about $1/16$ inch, electrode E has a diameter of $1/16$ inch, and the nozzle N has an axial length of more than seven inches.

It will be appreciated from the foregoing description that electrode E is advanced through the electrode and shielding gas passageway from inlet end 46 thereof to and through bore 114 of contact tip 112 to provide the weld metal for the shielded arc welding process. It will likewise be appreciated that shielding gas is flowed through the electrode and shielding gas passageway to exit through ports 120 in diffuser 106 and thence outwardly of the outlet end 36 of the nozzle about electrode E. It will also be appreciated that cooling fluid such as water is flowed through inlet line 42 to inlet portion 88 of the cooling fluid passage in cooling fluid section 38 and thence across connecting portion 94 to outlet portion 90 of the cooling fluid passage and outlet line 44 to a drain or cooling apparatus for the cooling fluid. Further, as will be appreciated from FIGS. 3–7, the inlet portion of the cooling fluid passageway increases in cross-sectional area intermediate the outer and inner ends thereof, whereby the cooling fluid is exposed to increased surface areas as it approaches the inner end of the inlet passageway and heat sink H to optimize the transfer of heat from sleeve 48 and from the heat sink components to the cooling water. Moreover, the change in surface area between the core and the inner surface of sleeve 48 at the transition to the larger surface area in the inlet passageway provides a pressure drop in the flow of cooling water which further promotes cooling thereof and thus the ability to optimize the cooling function thereof at the heat sink. Advantageously, connecting sleeve 54 extends around heat sink component 62 and thus the inner end of gas nozzle assembly 40 to promote cooling thereof by transferring heat to the heat sink. Likewise, sleeve 104 transfers heat from shroud 102 to diffuser 106 and to the lower end of heat sink components 54 and 62 to promote cooling of the shroud by transferring heat to the heat sink. The cooling and heat transfer provided by the foregoing structural features of the component parts of nozzle N advantageously enable the shielded arc welding of longitudinally adjacent railroad rails in the confined space therebetween as described hereinabove to be achieved without melting or otherwise damaging the gas nozzle assembly and especially the shroud 102, as the result of exposure thereof to the extremely high temperatures resulting from the welding process and the confined environment in which the latter takes place.

While considerable emphasis has been placed herein on the structures of and the structural interrelationships between the component parts of the preferred embodiment, it will be appreciated that other embodiments can be made and that many changes can be made in the preferred embodiment without departing from the principles of the invention. Accordingly, it is to be distinctly understood that the foregoing descriptive matter is to be interpreted merely as illustrative of the present invention and not as a limitation.

Having thus described the invention, it is so claimed:

1. A nozzle for a welding gun for shielded arc welding, said nozzle having an axis and axially spaced apart inlet and outlet ends and comprising a cooling fluid section at said inlet end coaxial with said axis and having an inner end spaced from said inlet end toward said outlet end, a gas nozzle assembly at said outlet end coaxial with said axis and having an inner end axially spaced from said outlet end and interconnected with said inner end of said cooling fluid section, said cooling fluid section and gas nozzle assembly including a shielding gas and electrode passage extending from said inlet end to said outlet end, said gas nozzle assembly including an electrode contact tip having an electrode opening therethrough coaxial with said axis, said passage including an outlet portion surrounding said tip, said cooling fluid section including a cooling fluid jacket, core means providing an axially extending cooling fluid passageway in said jacket having an inlet portion extending from said inlet end to said inner end of said cooling fluid section and an outlet portion extending from said inner end of said cooling fluid section to said inlet end, means for communicating said inlet and outlet portions at said inner end of said cooling fluid section, and means providing a heat sink and insulating section across said inner end of said cooling fluid section and said inner end of said gas nozzle assembly.

2. A nozzle according to claim 1, wherein said gas nozzle assembly includes a shroud coaxial with said axis and having axially inner and outer ends respectively adjacent said inner and outer ends of said gas nozzle assembly, a tubular gas diffuser in said shroud and coaxial therewith, said gas diffuser providing a portion of said gas and electrode passage and having upstream and downstream ends with respect to the direction of flow of shield gas therethrough, and a sleeve of plastic material between said shroud and said gas diffuser for conducting heat from said shroud to said heat sink.

3. A nozzle according to claim 2, wherein said contact tip is mounted on said downstream end of said gas diffuser.

4. A nozzle according to claim 3, wherein said plastic material is a thermosetting plastic material molded in place in said shroud.

5. A nozzle according to claim 4, wherein said shroud has an inner surface provided with means for restraining relative displacement between said shroud and said sleeve of plastic material.

6. A nozzle according to claim 5, wherein said inner surface is knurled to provide said means for restraining relative displacement.

7. A nozzle according to claim 2, wherein said sleeve of plastic material extends from said inner end of said shroud toward said outer end thereof and has a terminal end intermediate said inner and outer ends of said shroud, said downstream end of said gas diffuser being axially between said terminal end and said outer end of said shroud, and said portion of said gas electrode passage provided by said tubular gas diffuser including ports opening radially therethrough between said terminal end and said downstream end.

8. A nozzle according to claim 7, wherein said contact tip is mounted on said downstream end of said gas diffuser.

9. A nozzle according to claim 2, wherein said upstream end of said gas nozzle assembly includes means interengaging with said inner end of said cooling fluid section for releasably interconnecting said gas nozzle assembly and said cooling fluid section.

10. A nozzle according to claim 9, wherein said sleeve of plastic material and said gas diffuser sealingly interengage with said means providing a heat sink and insulating section at said inner end of said cooling fluid section.

11. A nozzle according to claim 10, wherein said sleeve of plastic material extends from said inner end of said shroud toward said outer end thereof and has a terminal end intermediate said inner and outer ends of said shroud, said downstream end of said gas diffuser being axially between said terminal end and said outer end of said shroud, and said portion of said gas and electrode passage provided by said tubular gas diffuser including ports opening radially therethrough between said terminal end and said downstream end.

12. A nozzle according to claim 11, wherein said plastic material is a thermosetting silicone material molded in place in said shroud.

13. A nozzle according to claim 12, wherein said means interengaging with said inner end of said cooling fluid section includes interengaging threads on said upstream end of said gas nozzle assembly and on said inner end of said cooling fluid section.

14. A nozzle according to claim 13, wherein said shroud has an inner surface knurled to restrain relative displacement between said shroud and said plastic material.

15. A nozzle according to claim 1, wherein said cooling fluid jacket includes a cooling fluid sleeve coaxial with said axis, said core means including a cooling fluid core in said cooling fluid sleeve and coaxial therewith, said core diametrically separating said inlet and outlet portions of said cooling fluid passageway.

16. A nozzle according to claim 15, wherein said cooling fluid sleeve has a circular inner surface and said core has diametrically opposed surface portions engaging said inner surface between said inlet end and said inner end of said cooling fluid section to diametrically separate said inlet and outlet portions.

17. A nozzle according to claim 16, wherein said surface portions engage said inner surface a first circumferential extent at a first location adjacent said inlet end of said cooling fluid section and a second circumferential extent less then said first extend at a second location spaced from said inlet end toward said inner end of said cooling fluid section.

18. A nozzle according to claim 17, wherein said core has an inner end at said inner end of said cooling fluid section and said means providing a heat sink and insulating section includes a sleeve of insulating material between said inner end of said core and said inner surface of said cooling fluid sleeve.

19. A nozzle according to claim 16, wherein said surface portions engage said inner surface a first circumferential extent along first axial portions of said core from said inlet and toward said inner end of said cooling fluid section and a second circumferential extent along second axial portions of said core from said first axial portions toward said inner end of said cooling fluid section.

20. A nozzle according to claim 19, wherein said core includes transition surfaces between said first and second axial portions thereof.

21. A nozzle according to claim 20, wherein said core has an inner end at said inner end of said cooling fluid section and said means providing a heat sink and insulating section includes a first sleeve of insulating material between said inner end of said core and said inner surface of said cooling fluid sleeve.

22. A nozzle according to claim 21, wherein said cooling fluid sleeve has an inner end abutting against said first sleeve of insulating material, said means providing a heat sink and insulating section further including a second sleeve of insulating material on said inner end of said cooling fluid sleeve and axially overlying a portion of said first sleeve of insulating material, and a metal sleeve surrounding said second sleeve of insulating material.

23. A nozzle according to claim 22, wherein said first sleeve of insulating material has an inner end sealingly interengaging with said inner end of said gas nozzle assembly.

24. A nozzle according to claim 16, wherein said diametrically opposed surface portions are first surface portions and said core includes second surface portions between said first surface portions and spaced radially inwardly from said inner surface of said cooling fluid sleeve to provide said inlet and outlet portions of said passageway therewith.

25. A nozzle according to claim 24, wherein said second surface portions are planar.

26. A nozzle according to claim 24, wherein said second surface portions include diametrically opposed pluralities of planar surfaces.

27. A nozzle according to claim 24, wherein said first surface portions engage said inner surface along first and second areas extending sequentially from said inlet end toward said inner end of said cooling fluid section, said first surface portions in said first area engaging said inner surface a first circumferential extent, and said first surface portions in said second area engaging said inner surface a second circumferential extent less than said first extent.

28. A nozzle according to claim 27, wherein said second surface portions in said first and second areas are diametrically opposed planar surfaces.

29. A nozzle according to claim 28, wherein said opposed planar surfaces in said first area are parallel surfaces and in said second area are opposed pluralities of planar surfaces.

30. A nozzle according to claim 28, wherein said first and second areas have areas of juncture therebetween and said core includes transition surfaces between said first and second surface portions in said areas of juncture.

31. A nozzle according to claim 30, wherein said core has an inner end at said inner end of said cooling fluid section and said means providing a heat sink and insulating section includes a first sleeve of insulating material between said inner end of said core and said inner surface of said cooling fluid sleeve.

32. A nozzle according to claim 31, wherein said cooling fluid sleeve has an inner end abutting against said first sleeve of insulating material, said means providing a heat sink and insulating section further including a second sleeve of insulating material on said inner end of said cooling fluid sleeve and axially overlying a portion of said first sleeve of insulating material, and a metal sleeve surrounding said second sleeve of insulating material.

33. A nozzle according to claim 1, wherein said gas nozzle assembly includes a shroud coaxial with said axis and axially spaced from said inner end of said cooling fluid section, said shroud having axially inner and outer ends respectively adjacent said inner and outer ends of said gas nozzle assembly, a tubular gas diffuser in said shroud and coaxial therewith, said gas diffuser providing a portion of said gas and electrode passage and having upstream and downstream ends with respect to the direction of flow of shield gas therethrough, and a sleeve of plastic material between said shroud and said gas diffuser for conducting heat from said shroud to said heat sink.

34. A nozzle for a welding gun for shielded arc welding, said nozzle having an axis and axially opposite inlet and outlet ends, a tubular cooling fluid jacket extending from said inlet end toward said outlet end coaxial with said axis and having axially outer and inner jacket ends, said jacket having an inner surface, a cooling core in said jacket having surface means providing a cooling fluid passageway with said inner surface, said passageway having an inlet portion extending from said outer jacket end toward said inner jacket end, an outlet portion extending from said inner jacket end toward said outer jacket end and a connecting portion at said inner end of said jacket for communicating said inlet and outlet portions, a tubular gas shroud extending from said outlet end toward said inlet end coaxial with said axis and having axially outer and inner shroud ends, a tubular gas diffuser in said shroud and coaxial therewith, a sleeve of heat transferring plastic material interposed between said diffuser and said shroud and extending from said inner end of said shroud toward said outer end thereof, said diffuser supporting a welding electrode contact tip adjacent said outer end of said shroud, said cooling core having an inner end extending axially inwardly beyond said inner jacket end, and a heat sink and insulating section axially overlying said inner ends of said jacket and said core.

35. A nozzle according to claim 34, wherein said shroud has a knurled inner surface and said plastic material is a thermosetting plastic material molded in place on said inner surface of said shroud.

36. A nozzle according to claim 34, wherein said heat sink and insulating section has a first end overlying said inner jacket end and a second end overlying said inner end of said core axially between said inner jacket end and said sleeve of heat transferring plastic material.

37. A nozzle according to claim 34, wherein said inner end of said core is internally threaded and said inner end of said diffuser is externally threaded for said diffuser to be removably mounted on said core.

38. A nozzle according to claim 33, wherein said surface means of said cooling core includes diametrically opposed surface portions engaging said inner surface of said jacket between said outer and inner ends thereof to diametrically separate said inlet and outlet portions of said passageway.

39. A nozzle according to claim 38, wherein said diametrically opposed surface portions are first surface portions and said core includes second surface portions between said first surface portions and spaced radially inwardly from said inner surface of said jacket to provide said inlet and outlet portions of said passageway therewith.

40. A nozzle according to claim 39, wherein said first surface portions engage said inner surface along first and second areas extending sequentially from said outer end toward said inner end of said jacket, said first surface portions in said first area engaging said inner surface a first circumferential extent, and said first surface portion in said second area engaging said inner surface a second circumferential extent less than said first extent.

41. A nozzle according to claim 40, wherein said first and second areas have areas of juncture therebetween and said core includes transition surfaces between said first and second surface portions in said areas of juncture.

42. A nozzle according to claim 41, wherein said core has an inner end at said inner end of said jacket, said inner end of said core having surfaces between said inlet and outlet portions of said cooling fluid passageway spaced radially inwardly from said inner surface of said jacket to provide said connecting portion for communicating said inlet and outlet portions of said cooling fluid passageway.

43. A nozzle according to claim 33, wherein said heat sink and insulating section includes a first sleeve of insulating material on said inner end of said jacket and a second sleeve of insulating material on said inner end of said core, said second sleeve having an end abutting said inner end of said jacket, said first sleeve having an end axially overlapping said end of said first sleeve, and a steel sleeve axially coextensive with and overlying said first sleeve.

44. A nozzle according to claim 43, wherein said second sleeve has an opposite end in abutting engagement with said sleeve of plastic material at said inner end of said shroud.

45. A nozzle according to claim 44, wherein said inner end of said core is internally threaded and said inner end of said diffuser is externally threaded for said diffuser to be removably mounted on said core.

46. A nozzle according to claim 45, wherein said diffuser and said sleeve of plastic material are threadedly interengaged for promoting the transfer of heat from said shroud to said diffuser.

47. A nozzle according to claim 45, wherein said plastic material is a thermosetting silicone material molded in place on said inner surface of said shroud.

48. A nozzle according to claim 47, wherein said inner surface of said shroud is knurled.

49. A nozzle for a welding gun for shielded arc welding, said nozzle having an axis and axially opposite inlet and outlet ends, a tubular cooling fluid jacket extending from said inlet end toward said outlet end coaxial with said axis and having axially outer and inner jacket ends, said jacket having an inner surface, a cooling core in said jacket having surface means providing a cooling fluid passageway with said inner surface, said passageway having an inlet portion extending from said outer jacket end toward said inner jacket end, an outlet portion extending from said inner jacket end toward said outer jacket end and a connecting portion at said inner end of said jacket for communicating said inlet and outlet portions, a tubular gas shroud extending from said outlet end toward said inlet end coaxial with said axis and having axially outer and inner shroud ends, a tubular gas diffuser in said shroud and coaxial therewith, a sleeve of heat transferring plastic material interposed between said diffuser and said shroud and extending from said inner end of said shroud toward said outer end thereof, said diffuser supporting a welding electrode contact tip adjacent said outer end of said shroud, said cooling core having an inner end extending axially inwardly beyond said inner jacket end, and a heat sink and insulating section axially overlying said inner ends of said jacket and said core, said diffuser and said sleeve of plastic material are threadedly interengaged for promoting the transfer of heat from said shroud to said diffuser.

50. A gas nozzle for a welding gun for shielded arc welding, comprising a cylindrical shroud having an axis, axially opposite ends and radially inner and outer surfaces between said ends, a tubular gas diffuser in said shroud and coaxial therewith, said diffuser having a radially outer surface spaced radially inwardly from said inner surface of said shroud to provide an annular space therebetween, and a sleeve of electrically insulating heat conducting plastic material filling said annular space from one of said opposite ends of said shroud to a location intermediate said opposite ends.

51. A gas nozzle according to claim 50, wherein said shroud and said diffuser are copper and said plastic material is a thermosetting silicone material.

52. A gas nozzle according to claim 50, wherein said sleeve of plastic material is molded in place on said inner surface of said shroud, and means interengaging said diffuser and said sleeve for separation from one another.

53. A gas nozzle for a welding gun for shielded arc welding, comprising a cylindrical shroud having an axis, axially opposite ends and radially inner and outer surfaces between said ends, a tubular gas diffuser in said shroud and coaxial therewith, said diffuser having a radially outer surface spaced radially inwardly from said inner surface of said shroud to provide an annular space therebetween, and a sleeve of electrically insulating heat conducting plastic material filling said annular space from one of said opposite ends of said shroud to a location intermediate said opposite ends, said sleeve of plastic material is molded in place on said inner surface of said shroud, and means interengaging said diffuser and said sleeve for separation from one another, said means interengaging said diffuser and said sleeve includes interengaging threads.

54. A gas nozzle according to claim 53, wherein said sleeve is internally threaded and said diffuser is externally threaded.

55. A gas nozzle according to claim 54, wherein said shroud and said diffuser are copper and said plastic material is a thermosetting silicone material.

56. A gas nozzle according to claim 55, wherein said inner surface of said shield is knurled in the area of molding of said sleeve on said shield.

57. A gas nozzle according to claim 56, wherein said shroud and said sleeve each have a radial thickness of about $1/16$ inch.

58. A nozzle for a welding gun for shielded arc welding, said nozzle having an axis and axially spaced apart inlet and outlet ends and comprising a cooling fluid section at said inlet end coaxial with said axis and having an inner end spaced from said inlet end toward said outlet end, and a terminal end axially spaced from said inner end toward said outlet end, a gas nozzle assembly at said outlet end coaxial with said axis and having an inner end axially spaced from said outlet end and interconnected with said terminal end of said cooling fluid section, said inner end of said gas nozzle assembly being axially spaced from said inner end of said cooling fluid section, said cooling fluid section and gas nozzle assembly including a shielding gas and electrode passage extending from said inlet end to said outlet end, said gas nozzle assembly including an electrode contact tip having an electrode opening therethrough coaxial with said axis, said passage including an outlet portion surrounding said tip, said cooling fluid section including a cooling fluid jacket, core means providing an axially extending cooling fluid passageway in said jacket having an inlet portion extending from said inlet end to said inner end of said cooling fluid section and an outlet portion extending from said inner end of said cooling fluid section to said inlet end, means for communicating said inlet and outlet portions at said inner end of said cooling fluid section, and a heat sink and insulating section across said inner end of said cooling fluid section and said inner end of said gas nozzle assembly.

* * * * *